United States Patent
Ou et al.

(10) Patent No.: US 7,442,155 B2
(45) Date of Patent: Oct. 28, 2008

(54) AUTOMATIC CLAMP CHANGING APPARATUS

(75) Inventors: Chun-Nan Ou, Shenzhen (CN); Jian-Long Xing, Shenzhen (CN); Rong-Mou Bao, Shenzhen (CN); Cheng-Bin Su, Shenzhen (CN); Xiao-Yun Yuan, Shenzhen (CN); Jin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 267 days.

(21) Appl. No.: 11/309,581

(22) Filed: Aug. 25, 2006

(65) Prior Publication Data

US 2007/0186732 A1   Aug. 16, 2007

(30) Foreign Application Priority Data

Feb. 11, 2006   (CN) .......................... 2006 1 0033597

(51) Int. Cl.
B23Q 3/155   (2006.01)

(52) U.S. Cl. .............................. 483/59; 483/901; 901/41

(58) Field of Classification Search ................. 483/901, 483/902, 59, 1, 16, 58, 65; 901/30, 31, 41; 279/901

See application file for complete search history.

(56) References Cited

U.S. PATENT DOCUMENTS

| | | | | |
|---|---|---|---|---|
| 4,486,928 A | * | 12/1984 | Tucker et al. | 483/901 |
| 4,604,787 A | * | 8/1986 | Silvers, Jr. | 483/901 |
| 4,613,277 A | * | 9/1986 | Guay | 901/39 |
| 4,660,274 A | * | 4/1987 | Goumas et al. | 483/901 |
| 5,256,128 A | | 10/1993 | Neumann | |
| 5,380,117 A | * | 1/1995 | Buschulte | 901/29 |
| 6,454,684 B2 | | 9/2002 | Kato | |
| 7,118,147 B2 | * | 10/2006 | Fujii | 901/39 |

FOREIGN PATENT DOCUMENTS

| | | | |
|---|---|---|---|
| GB | 2192855 A | * | 1/1988 |
| JP | 04-012935 A | * | 1/1992 |

* cited by examiner

*Primary Examiner*—Erica E Cadugan
(74) *Attorney, Agent, or Firm*—Wei Te Chung

(57) ABSTRACT

A clamp changing apparatus includes a holder (70) including a plurality of clamp-holding devices (72), each of which holding a clamp (10) thereon, a robot (50) including a shaft (501), and a coupling device (30) secured on the shaft of the robot. The robot selects one of the clamps held on the clamp-holding devices according to a predetermined machining program therein, changes out a used clamp for the selected clamp, and mounts the selected clamp on the coupling device.

15 Claims, 6 Drawing Sheets

AUTOMATIC CLAMP CHANGING APPARATUS

DESCRIPTION

1. Field of the Invention

The present invention pertains to a clamp changing apparatus, and particularly to an automatic clamp changing apparatus capable of automatically changing a currently-used clamp for a next clamp to be used during operation if necessary.

2. Description of Related Art

Until now, the operation of changing a clamp of a robot or a machine, in particular a complicated or heavy clamp, has had to be carried out manually by at least one operator using tools such as levers and screw drivers or other special tools. Detachment of the clamp and replacement with another clamp is done while the machine is stopped, and thus operation of the machine cannot be continuous during production cycles. Consequently, valuable time and power are wasted, thereby leading to low productivity.

Therefore, a heretofore unaddressed need exists in the industry to overcome the aforementioned deficiencies and inadequacies.

SUMMARY OF THE INVENTION

In an exemplary embodiment, a clamp changing apparatus includes a holder including a plurality of clamp-holding devices, each of which holds a clamp thereon, a robot including a shaft, and a coupling device secured on the shaft of the robot. The robot selects one of the clamps on the clamp-holding devices according to a predetermined machining program therein, changes out a used clamp for the selected clamp, and mounts the selected clamp on the coupling device.

Other advantages and novel features will become more apparent from the following detailed description of preferred embodiments when taken in conjunction with the accompanying drawings, in which:

DETAILED DESCRIPTION OF THE INVENTION

Figure 1:
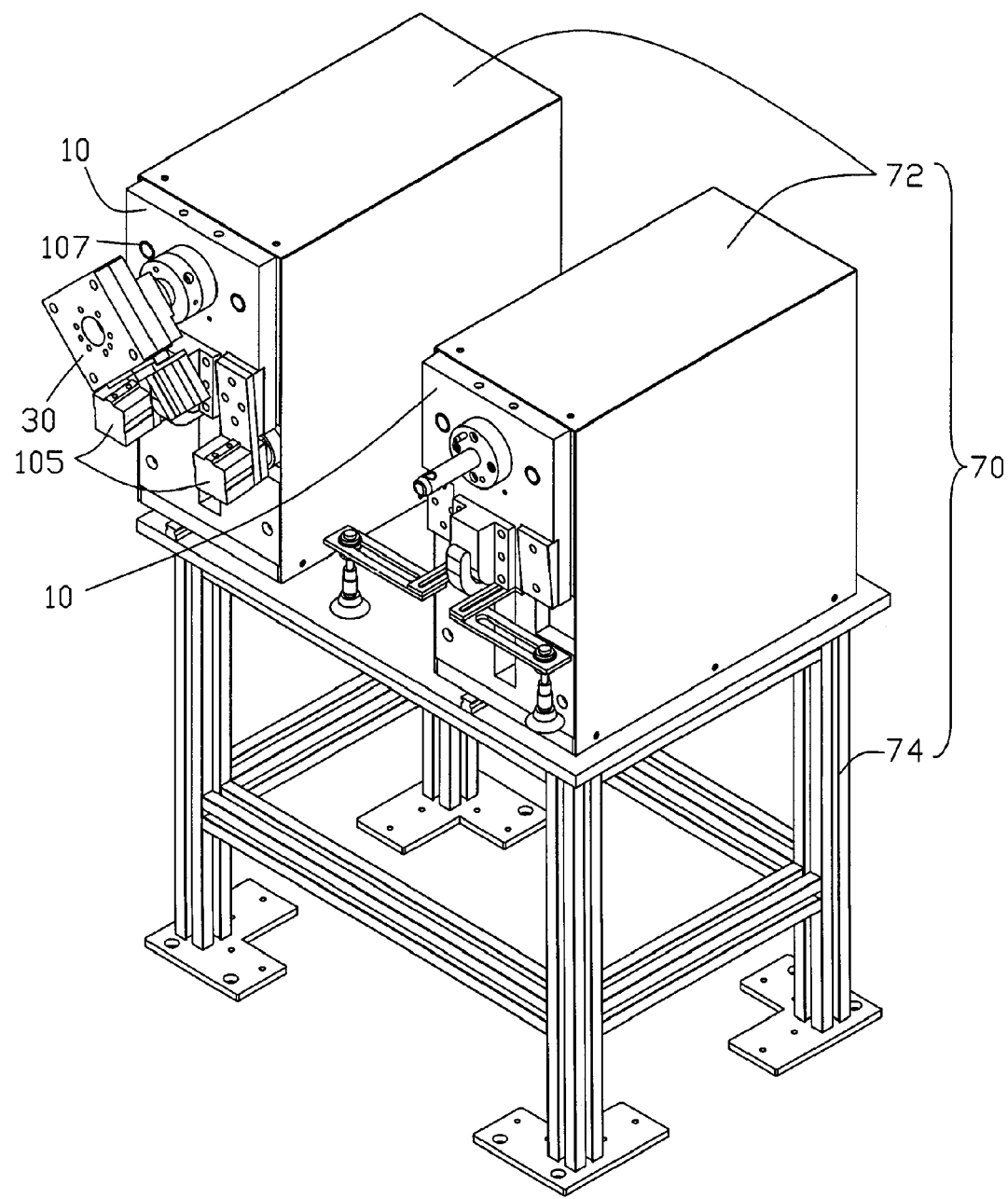
FIG. 1 is an assembled, isometric view of a holder, and a coupling device of an exemplary embodiment of the present invention.
Figure 2:
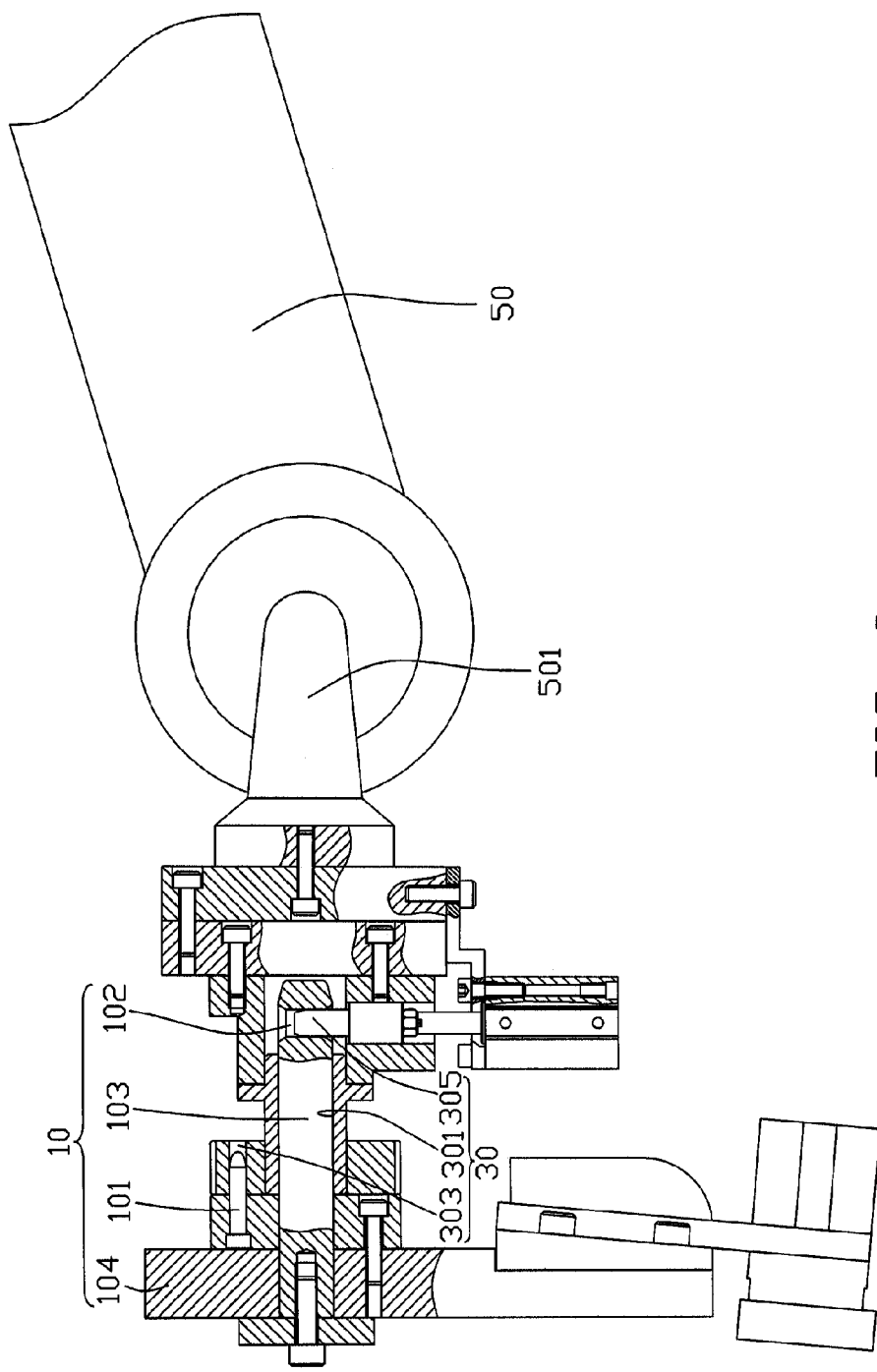
FIG. 2 is an assembled view of a robot, a clamp, and the coupling device of the exemplary embodiment of the present invention, with a portion shown in cross-section.

Referring to FIGS. 1 and 2, a clamp changing apparatus of an exemplary embodiment of the present invention comprises a holder 70, a robot 50, and a coupling device 30. The holder 70 comprises a plurality of clamp-holding devices 72, each of which holds a clamp 10 thereon. The robot 50 comprises an output shaft 501. The coupling device 30 is mounted to the output shaft 501. The output shaft 501 is used for controlling the movement of the clamp 10 mounted to the coupling device 30.

Figure 3:
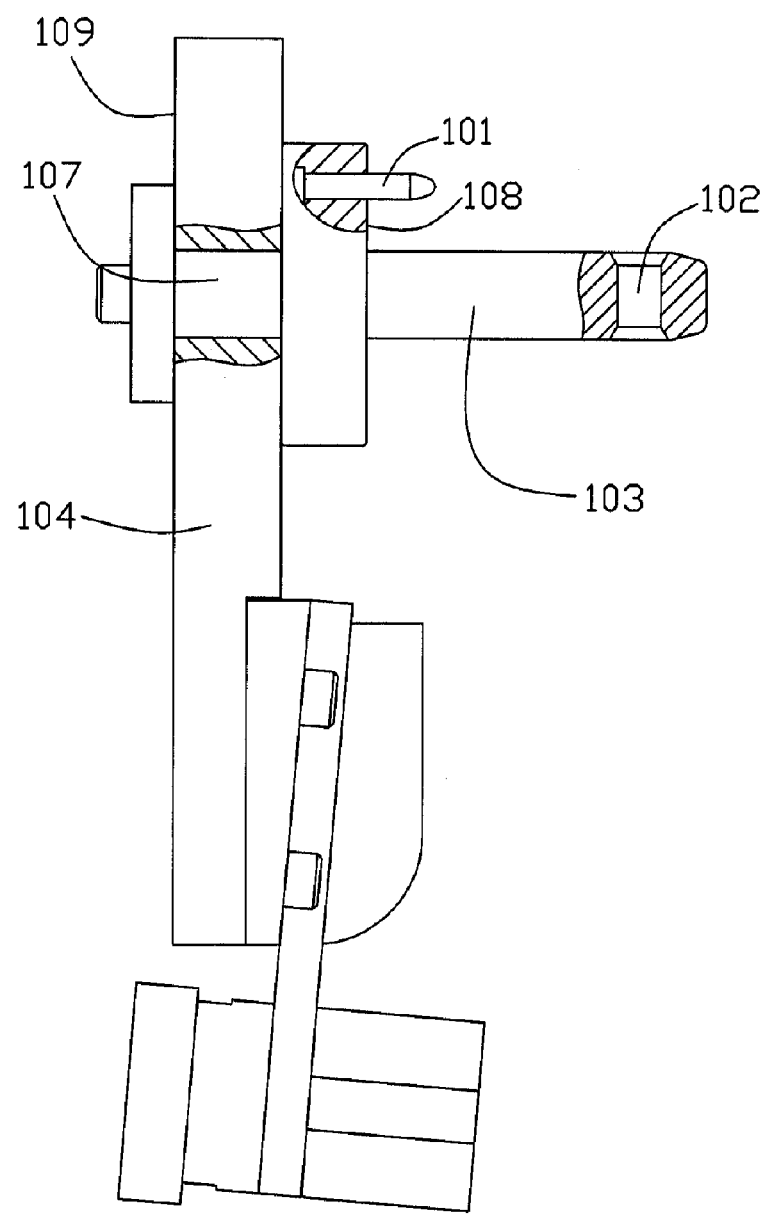
FIG. 3 is a plan view of the clamp of the exemplary embodiment of the present invention.

Referring also to FIG. 3, the clamp 10 of the exemplary embodiment of the present invention is shown. The clamp 10 comprises a clamp body 104 having a first surface 108 and an opposite second surface 109, and the first surface 108 having a primary shaft 103 perpendicularly disposed thereon. The primary shaft 103 defines a fixing hole 102 extending therethrough in a radial direction at a distal end thereof. The clamp 10 further comprises a positioning pin 101 perpendicularly disposed on the first surface 108. The positioning pin 101 is parallel to the primary shaft 103. The clamp body 104 defines a pair of receiving holes 107 parallel to the primary shaft 103. Each receiving hole 107 extends through the clamp body 104.

Figure 4:
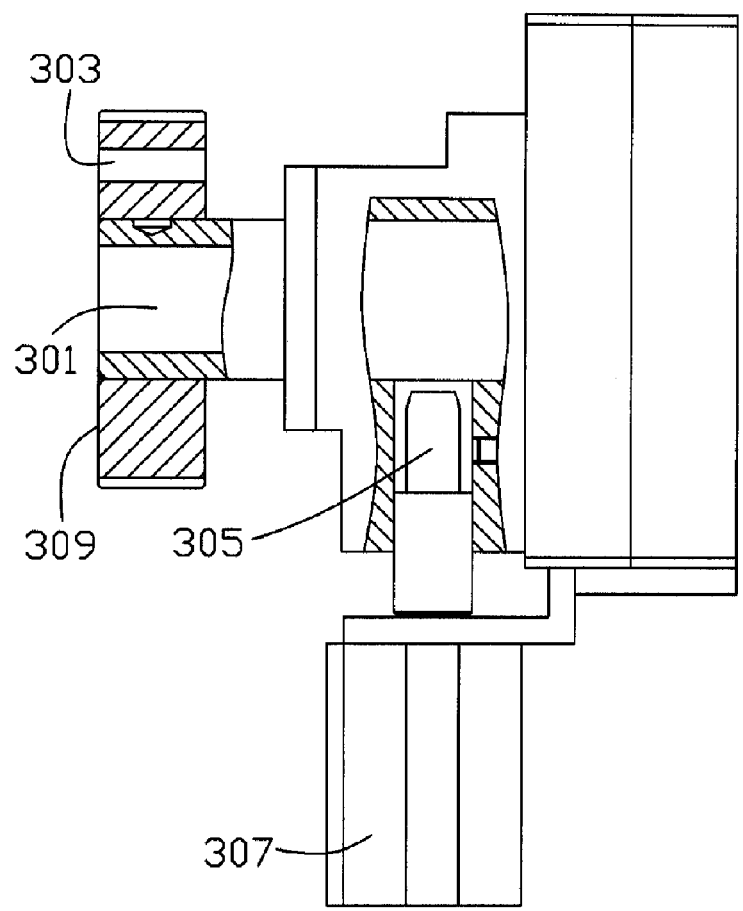
FIG. 4 is a plan view of the coupling device of the exemplary embodiment of the present invention.

Referring to FIG. 4, the coupling device 30 of the exemplary embodiment of the present invention is shown. The coupling device 30 comprises an end surface 309. A shaft hole 301 for receiving the primary shaft 103 of the clamp 10, and a positioning hole 303 for receiving the positioning pin 101 of the clamp 10 are defined in the end surface 309 parallel to each other. The coupling device 30 further comprises a fixing pin 305 perpendicular to the shaft hole 301 thereof, and a driving cylinder 307 coupled with the fixing pin 305 for driving the fixing pin 305 into and out of the fixing hole 102 of the primary shaft 103. The fixing pin 305 is received in the fixing hole 102 for preventing the clamp 10 from disengaging when the clamp 10 is mounted to the coupling device 30.

Figure 5:
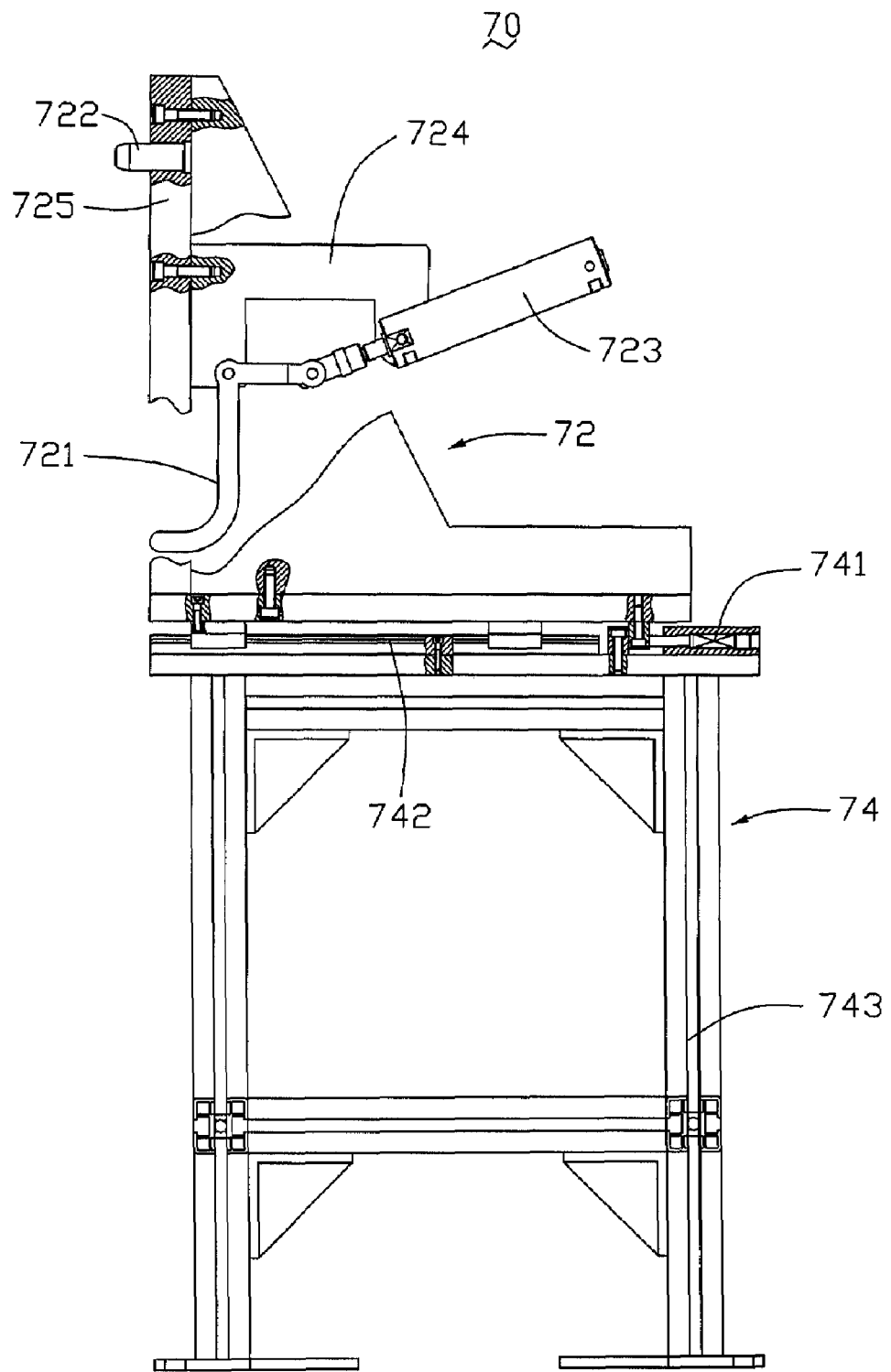
FIG. 5 is a view of part of the holder of the exemplary embodiment of the present invention, with a portion shown in cross-section.

Referring to FIGS. 1 and 5, the holder 70 comprises a base 74 firmly secured on a surface such as a floor, and a pair of clamp-holding devices 72. The base 74 comprises a frame 743 firmly secured on the surface, a pair of sliding paths 742 disposed on top of the frame 743, and a pair of bumper members 741 respectively disposed at an end of each sliding path 742 for dampening vibration produced by the clamp-holding devices 72 during operation. Each clamp-holding device 72, slidably disposed on the corresponding sliding path 742 of the base 74, comprises a frame 724, a hook 721 for securing the clamp 10 thereon, and a driving cylinder 723 coupled with the hook 721. The hook 721 is rotatably mounted on the frame 724. Each clamp-holding device 72 further comprises a wall 725, and two positioning pins 722 perpendicularly disposed on the wall 725. As an alternative exemplary embodiment, the bumper member 741 may be a spring bumper member 741.

Figure 6:
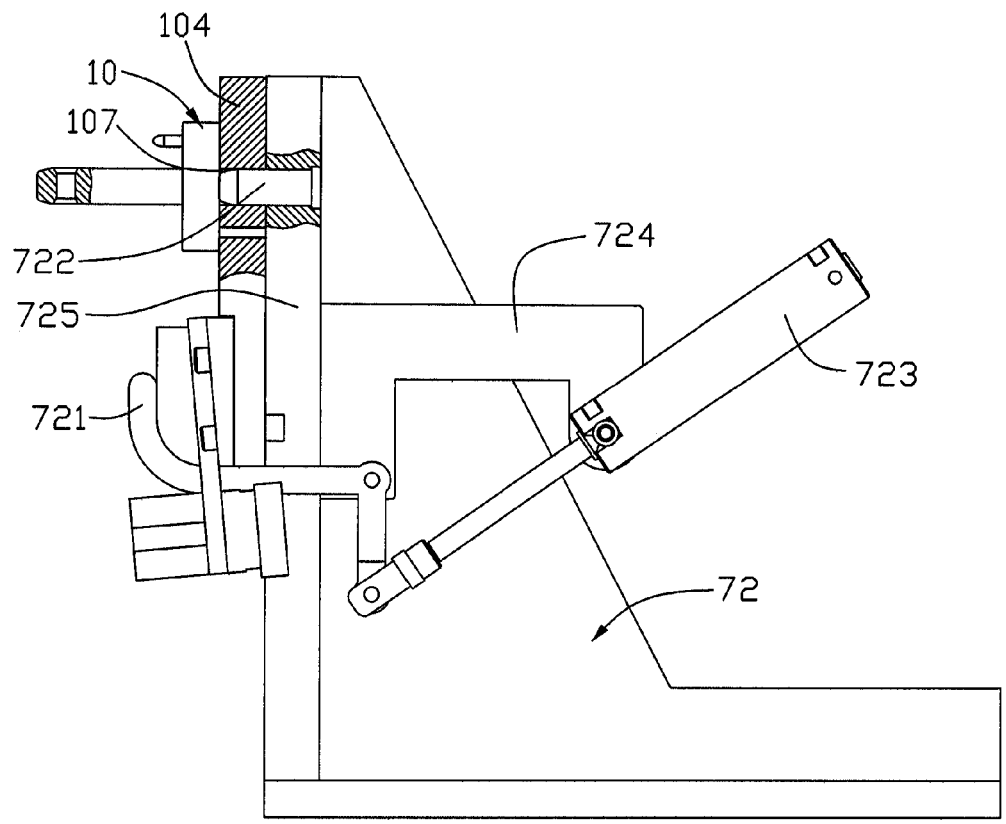
FIG. 6 is an assembled view of part of the clamp and the holder, with a portion shown in cross-section.

Referring to FIGS. 1, 2 and 6, in assembly, the coupling device 30 is mounted to the output shaft 501 manually by an operator before use. One of the clamps 10 is mounted to the coupling device 30. The primary shaft 103 and the positioning pin 101 of the clamp 10 are received in the shaft hole 301 and the positioning hole 303 respectively. The fixing pin 305 is received in the fixing hole 102. Each of the temporarily unused clamps 10 is held on the corresponding clamp-holding device 72. The positioning pins 722 of the corresponding clamp-holding device 72 are received in the receiving holes 107 respectively. The clamp body 104 is hooked on the hook 721 of the corresponding clamp-holding device 72 so as to secure the clamp 10 on the corresponding clamp-holding device 72.

During use, after the coupling device 30 is mounted to the output shaft 501 manually by an operator, and the one of the clamps 10 is no longer needed, the robot 50 automatically selects another appropriate clamp 10 according to a predetermined machining program therein from the clamps 10 held on the clamp-holding devices 72 thus changing the used clamp 10 for the selected clamp 10 to machine a workpiece. During this process, the driving cylinder 723 of the corresponding clamp-holding device 72 drives the hook 721 to loosen the selected clamp 10. The primary shaft 103 is inserted into the shaft hole 301. The driving cylinder 307 of the coupling device 30 drives the fixing pin 305 into the fixing hole 102 of the primary shaft 103, thereby mounting the selected clamp 10 on the coupling device 30. When the clamp 10 in use needs to be exchanged for another appropriate clamp 10 to meet the requirement of machining, the robot 50 demounts the used clamp 10, puts the used clamp 10 back on the corresponding clamp-holding device 72, and selects the another appropriate clamp 10 according to the predetermined machining program therein from the clamps 10 held on the clamp-holding devices 72, then the robot 50 mounts the selected clamp 10 to the coupling device 30 according to the same process described above. Therefore during the machining of the workpiece, the clamp change is automatically implemented by the robot 50 according to the predetermined machining program therein so as to reduce the clamp change time with a shortened work interruption time thus improving the productivity.

While exemplary embodiment has been described above, it should be understood that it has been presented by way of example only and not by way of limitation. Thus the breadth and scope of the present invention should not be limited by the above-described exemplary embodiment, but should be defined only in accordance with the following claims and their equivalents.

What is claimed is:

1. A clamp changing apparatus, comprising:
   a holder comprising a base supporting a plurality of clamp-holding devices, each of which holds a clamp thereon, and wherein each of the clamp-holding devices comprises a hook for securing the clamp thereon, and a driving cylinder coupled with the hook for rotatably driving the hook;
   a robot having a shaft; and
   a coupling device secured on the shaft of the robot;
   wherein the robot, according to a machining program therein, selects one of the clamps held on the clamp-holding devices, changes out a used clamp for the selected clamp, and mounts the selected clamp on the coupling device.

2. The clamp changing apparatus as claimed in claim 1, wherein the clamp comprises a clamp body having a first surface and an opposite second surface, and the first surface having a primary shaft perpendicularly disposed thereon, the primary shaft defining a fixing hole extending therethrough in a radial direction at a distal end thereof.

3. The clamp changing apparatus as claimed in claim 2, wherein the clamp further comprises a positioning pin disposed on the first surface and parallel to the primary shaft.

4. The clamp changing apparatus as claimed in claim 3, wherein the clamp body defines at lease one receiving hole parallel to the primary shaft, the receiving hole extending through the clamp body.

5. The clamp changing apparatus as claimed in claim 4, wherein the coupling device comprises an end surface, and defines a shaft hole for receiving the primary shaft of the clamp and a positioning hole for receiving the positioning pin of the clamp in the end surface respectively.

6. The clamp changing apparatus as claimed in claim 5, wherein the coupling device further comprises a fixing pin perpendicular to the shaft hole thereof, the fixing pin being received in the fixing hole of the primary shaft of the clamp for preventing the clamp from disengaging when the clamp is mounted to the coupling device.

7. The clamp changing apparatus as claimed in claim 6, wherein the coupling device further comprises a driving cylinder coupled with the fixing pin for driving the fixing pin into the fixing hole of the primary shaft of the clamp.

8. The clamp changing apparatus as claimed in claim 1, wherein the base is firmly secured on a surface.

9. The clamp changing apparatus as claimed in claim 1, wherein the plurality of clamp-holding devices comprises a pair of aligned clamp-holding devices each disposed on top of the base respectively.

10. The clamp changing apparatus as claimed in claim 1, wherein each of the clamp-holding devices comprises a frame, the hook being rotatably mounted on the frame.

11. The clamp changing apparatus as claimed in claim 1, wherein each of the clamp-holding devices further comprises a wall, and a positioning pin disposed on the wall.

12. The clamp changing apparatus as claimed in claim 1, wherein the base comprises a frame firmly secured on the floor surface, a plurality of spaced sliding paths disposed on top of the frame and a bumper disposed at an end of each sliding path for dampening vibration produced by the clamp-holding devices during operation.

13. The clamp changing apparatus as claimed in claim 12, wherein each of the clamp-holding devices is slidably disposed on the sliding path of the base.

14. The clamp changing apparatus as claimed in claim 12, wherein the bumper is a spring bumper.

15. A clamp changing apparatus, comprising:
   a holder comprising a base supporting a plurality of clamp-holding devices, each of which holds a clamp thereon, wherein the base comprises a frame, a plurality of spaced sliding paths disposed on top of the frame, and a bumper disposed at an end of each sliding path for dampening vibration produced by the clamp-holding devices during operation;
   a robot having a shaft; and
   a coupling device secured on the shaft of the robot;
   wherein the robot, according to a machining program therein, selects one of the clamps held on the clamp-holding devices, changes out a used clamp for the selected clamp, and mounts the selected clamp on the coupling device.

* * * * *